US012619943B2

(12) United States Patent
Lazier et al.

(10) Patent No.: US 12,619,943 B2
(45) Date of Patent: May 5, 2026

(54) SHIPPABLE NETWORK-ATTACHED DATA STORAGE DEVICE WITH UPDATEABLE ELECTRONIC DISPLAY

(71) Applicant: Amazon Technologies, Inc., Seattle, WA (US)

(72) Inventors: Colin Laird Lazier, Seattle, WA (US); William J. Vass, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 104 days.

(21) Appl. No.: 18/305,275

(22) Filed: Apr. 21, 2023

(65) Prior Publication Data

US 2023/0267407 A1 Aug. 24, 2023

Related U.S. Application Data

(63) Continuation of application No. 16/517,311, filed on Jul. 19, 2019, now Pat. No. 11,669,800, which is a
(Continued)

(51) Int. Cl.
*G06Q 10/0835* (2023.01)
*G06Q 10/08* (2024.01)

(52) U.S. Cl.
CPC ......... *G06Q 10/0835* (2013.01); *G06Q 10/08* (2013.01)

(58) Field of Classification Search
CPC ........................... G06Q 10/0835; G06Q 10/08
See application file for complete search history.

(56) References Cited

U.S. PATENT DOCUMENTS

| 7,035,856 B1 | 4/2006 | Morimoto |
| 8,630,537 B2 | 1/2014 | Kadaba |
| (Continued) | | |

FOREIGN PATENT DOCUMENTS

| CN | 101310486 A | 11/2008 |
| CN | 102360463 A | 2/2012 |
| (Continued) | | |

OTHER PUBLICATIONS

K.y. Chen, Ultra-thin electronic device package, 2000, p. 22-25 (Year: 2000).*

(Continued)

*Primary Examiner* — Ibrahim N El-Bathy
(74) *Attorney, Agent, or Firm* — Robert C. Kowert; Kowert, Hood, Munyon, Rankin & Goetzel, P.C.

(57) ABSTRACT

A network-attachable data transfer device housed within a shippable enclosure that incorporates an updateable electronic display for displaying shipping destination information is disclosed. The device may be initialized (e.g., prepared to receive data, and the updateable electronic shipping display set to the shipping destination) by a service provider and shipped, in accordance with the displayed destination address, as a self-contained shipping unit. The device may be installed onto a network at the destination and loaded with data. The display may also be updated with the next destination address such that the device is shipped to the updated destination address (e.g., back to the service provider, or onto other destinations before being send back to the service provider). When the device is received back at the service provider, the data is transferred from the device to a service provider storage facility, wiped of data, and prepared to be sent out again.

20 Claims, 11 Drawing Sheets

A
Customer creates job via provider (SP) interface

Enterprise Location x
110

C
Device is received and customer data is transferred to device at customer site D
Dynamic address display label of device is updated Address X Display
131
Device 214

Network
108

Address SP Display
131
Device 214

E
Device is shipped to provider

B
SP provisions and ships device to customer according to job info

Storage Service Provider (SP) Location
120

F
Customer data is ingested from device into SP system

G
Device is wiped & waits for provisioning

Related U.S. Application Data continuation of application No. 14/788,671, filed on Jun. 30, 2015, now Pat. No. 10,360,529.

(56) References Cited

U.S. PATENT DOCUMENTS

| | | | |
|---|---|---|---|
| 8,798,784 B1 | 8/2014 | Clark et al. | |
| 9,037,912 B1 | 5/2015 | Klein et al. | |
| 9,270,683 B2 | 2/2016 | Coughlin et al. | |
| 9,294,564 B2 | 3/2016 | Sorenson, III | |
| 9,405,333 B1* | 8/2016 | Pine .................. | G06F 1/1656 |
| 9,934,389 B2 | 4/2018 | Paterra et al. | |
| 10,360,529 B2 | 7/2019 | Lazier et al. | |
| 2002/0067601 A1 | 6/2002 | Hsu et al. | |
| 2003/0163287 A1 | 8/2003 | Vock et al. | |
| 2006/0004675 A1* | 1/2006 | Bennett .......... | G06Q 10/08345 |
| | | | 705/402 |
| 2006/0064709 A1 | 3/2006 | Throckmorton et al. | |
| 2007/0124020 A1* | 5/2007 | Staples ................. | G06Q 10/08 |
| | | | 700/229 |
| 2008/0189705 A1 | 8/2008 | Weinert et al. | |
| 2009/0319078 A1* | 12/2009 | Jackson ................ | G06Q 10/08 |
| | | | 700/227 |
| 2010/0138764 A1* | 6/2010 | Hatambeiki .......... | G11B 27/34 |
| | | | 715/765 |
| 2010/0245105 A1 | 9/2010 | Smith | |
| 2011/0225426 A1 | 9/2011 | Agarwal et al. | |
| 2013/0326583 A1* | 12/2013 | Freihold ............ | G06F 3/04883 |
| | | | 726/3 |
| 2015/0175333 A1 | 6/2015 | Richardson et al. | |
| 2015/0324745 A1* | 11/2015 | Goodall ................ | G06Q 10/08 |
| | | | 705/337 |
| 2015/0350316 A1* | 12/2015 | Calder ............... | G06F 11/1076 |
| | | | 714/48 |

FOREIGN PATENT DOCUMENTS

| | | | |
|---|---|---|---|
| CN | 103026375 | A | 4/2013 |
| CN | 103069774 | A | 4/2013 |
| CN | 103384880 | A | 11/2013 |
| CN | 103620597 | A | 3/2014 |
| CN | 103685448 | A | 3/2014 |
| CN | 103930879 | A | 7/2014 |
| CN | 204331796 | U | 5/2015 |
| JP | 2004531923 | | 10/2004 |
| KR | 1020130107383 | | 10/2013 |
| WO | 02071382 | | 9/2002 |

OTHER PUBLICATIONS

Liza Zyga weblo, "Light-up Cereal Boxes Powered by Shelvers on Display at CES," Jan. 11, 2011, Phys.org 2003-2015, Science X Network, downloaded from http://phys.org/news/201101lightupcerealpoweredshelvesces.html, pp. 1-13.

Anonymous, "How to turn an old netbook into a NAS Drive", dated Mar. 1, 2010, pp. 1-5.

Hermann Apfelbock, "Alte Gerate in NAS-Server Verwandeln-PC-WELT", dated Jun. 13, 2014, pp. 1-7.

Office Action from European Application No. 16739357.8-1222, (Amazon Technologies, Inc.), dated Jun. 11, 2018, pp. 1-8.

Office Action from Japanese Application No. 2017-566702, (English Translation and Japanese version), dated Mar. 5, 2019, pp. 1-8.

International Search Report and Written Opinion from PCT/US2016/040510, Date of mailing Aug. 25, 2016, Amazon Technologies, Inc., pp. 1-17.

Jeff Barr, "AWS Import/Export: Ship US That Disk! AWS Blog", Published May 21, 2009, Retrieved from URL: https://aws.amazon.com/blogs/aws/send-us-that-data/, pp. 1-6.

Anonymous, "Batch Cloud Data Transfer Services—Amazon Import/Export Snowball Applicance", Jun. 17, 2016, Retrieved from URL: https://web.archive.org/web/20160617044144/http://aws.amazon.com/importexport/, pp. 1-6.

Notice of Preliminary Rejection from Korean Application No. 10-2018-7000988, (English translation, Korean Version), pp. 1-22.

Office Action mailed Jun. 21, 2024 in Chinese patent application No. 202111367026.6, Amazon Technologies, Inc., pp. 1-9 (including transl).

Office Action mailed Feb. 2, 2021 in Chinese Application No. 201680038541.0, Amazon Technologies, Inc., pp. 1-12 (including transl).

* cited by examiner

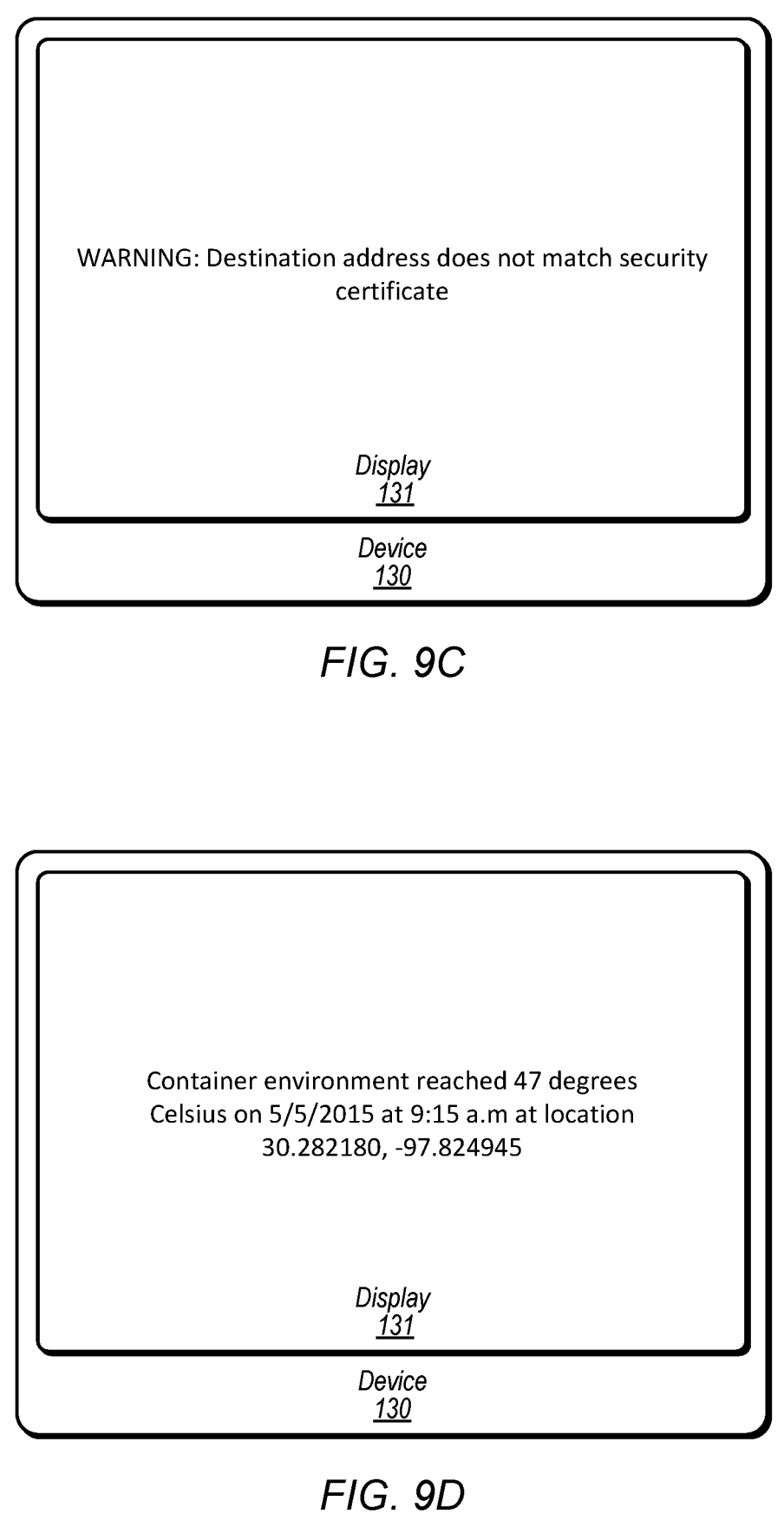

WARNING: Destination address does not match security certificate

*Display*
*131*

*Device*
*130*

FIG. 9C

Container environment reached 47 degrees Celsius on 5/5/2015 at 9:15 a.m at location 30.282180, -97.824945

*Display*
*131*

*Device*
*130*

FIG. 9D

SHIPPABLE NETWORK-ATTACHED DATA STORAGE DEVICE WITH UPDATEABLE ELECTRONIC DISPLAY

This application is a continuation of U.S. patent application Ser. No. 16/517,311, filed Jul. 19, 2019, which is a continuation of U.S. patent application Ser. No. 14/788,671, filed Jun. 30, 2015, now U.S. Pat. No. 10,360,529, which is hereby incorporated by reference herein in its entirety.

BACKGROUND

Growth of data storage capacity and big data has far outpaced the rate of increase of data transmission bandwidth capable of transferring big data. The discrepancy is so great that transmitting big data from one storage facility to another storage facility can be prohibitively costly (e.g., requiring costly system upgrades) or lengthy (e.g., transmission taking months to years). Physically moving the storage media may leave the data on legacy hardware or may not be an available option (e.g., when the data was stored by a storage service on behalf of the customer). Some solutions have involved transferring the data to a portable storage device (e.g., network attached storage devices) and shipping the portable storage device to another storage facility where the data is transferred to another storage system.

However, when it comes to shipping, placing items into containers and labels onto the containers offers numerous opportunities for human mistakes that may prevent the correct item from being shipped to the correct destination. For example, the wrong item may be placed in a box or the wrong label may be placed on the box, causing a customer to receive the wrong item.

In particular, when an order is placed for an item, the item is fetched and a box for shipping the item selected. Sometimes items are boxed in an area with other items and human or other error may cause an item to be placed into a box that was not intended for the item. In another example, labels for shipping container may be printed and placed onto the containers. Again, human or other error may cause a label to be printed incorrectly or placed on a box that was not intended for the label. Furthermore, disposable shipping containers, such as cardboard shipping containers may not be the best use of resources as they are often only used once or a few times before being disposed.

Further, some such errors may happen either at a place of business that is fulfilling the order or at a customer site, for example, a customer site that is returning the item to the place of business where it was ordered.

BRIEF DESCRIPTION OF THE DRAWINGS

FIGS. 9A-9D illustrate various types of information displayed via an updateable electronic display, according to some embodiments.

Figure 1:
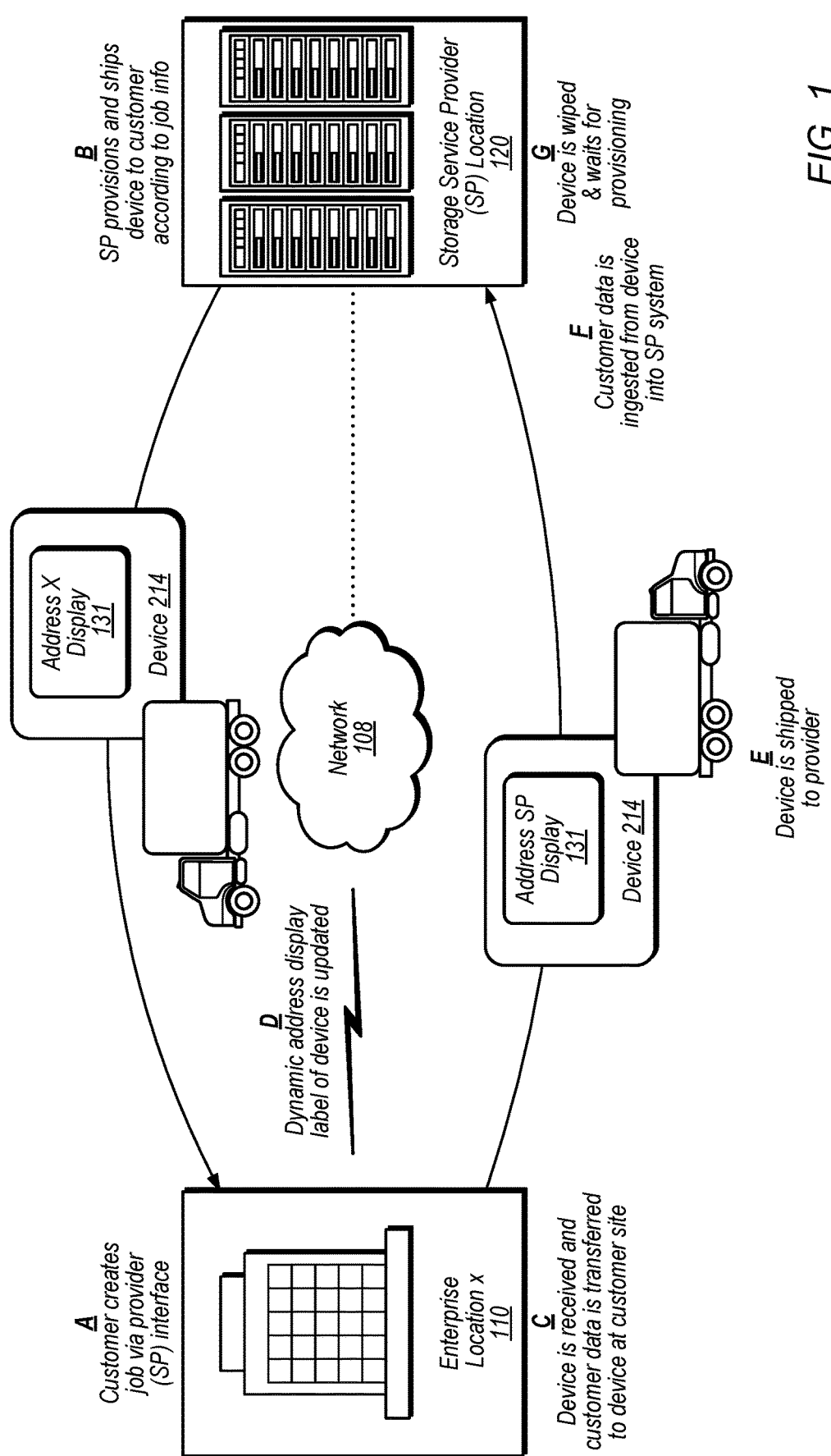
FIG. 1 illustrates a system and process for a shippable data storage device with network-updateable electronic ink shipping display, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments describe systems and processes associated with a shippable data storage device that includes an electronic shipping display that is used to display the destination shipping address of the shippable data storage device.

In some instances, the self-contained device may include an enclosure suitable for shipping the storage device so that no additional packaging is necessary. For example, the enclosure may include an updateable electronic display that displays shipping information such that a carrier can scan or read the shipping information from the display and deliver the device to a destination based on the displayed shipping information. The device may be used for moving large amounts of data from one large data storage facility to another large data storage facility, in embodiments. The device may be used for moving data from one storage facility to another storage facility when data transmission networks cannot move the data fast enough. For instance, a petabyte of data can take years to transmit over some network connections, whereas transfer of the data from a storage facility to the device may take days or less and physical shipment of the shippable storage device can be as fast as overnight. The device may also be used for moving data from one storage facility to another facility when a highly secure means of transfer is required.

In embodiments, import or export may be in reference to a service provider that owns or controls the devices or stores the data on behalf of a customer. For example, moving data from a customer to a storage service provider via shippable data storage device may be referred to as an import and moving data from a storage service provider to a customer via shippable data storage device may be referred to as an export. In some embodiments, data may be multicast, for example, sent from a customer to a storage service provider where the data is uploaded to a storage service and then the device is further shipped onto the customer's customers (e.g., via the device continuing on from the storage service provider, with the data, after data is uploaded at the storage service provider). A multi-cast scenario may apply in the export embodiment, as well. A multi-cast embodiment may refer to a single device being loaded with data at a source and then sent to multiple different destinations to distribute copies at the multiple different destinations or may refer to multiple different shippable data storage devices being loaded with the same copy of data and each device being sent to a different destination. In some multicast embodiments, multiple different devices, each device for transferring a portion of a large amount of data may be shipped as a group to a first destination and then onto another destination, leaving copies of the large amount of data at each destination (e.g., seeding different office's) before being returned to the service provider. A customer may request for export of data from the service provider storage network to multiple locations or customers, for instance.

For example, some large data storage facilities store large amounts of data, but have no way to transfer the large amounts of data external to the facility. In some instances, an enterprise storage facility may have grown over time with the data being used exclusively within then enterprise such that external data transmission facilities sufficient to reasonably move large amounts of data were never realized. Moving such large amounts of data to a cloud-based storage solution cost-effectively and in a timely manner may be difficult or even impossible.

In a particular example, moving big data (e.g., terabytes or petabytes of data or the like) from one storage facility to another may take months or years to transmit with current bandwidth solutions. An alternative is to locally transfer the data to multiple data transfer devices over a number of days or weeks at the one storage system and then ship the multiple transfer devices to the other storage system and locally transfer the data from the multiple transfer devices to the destination storage system.

The device may be equipped with an electronic display as part of or incorporated into the enclosure of the device. In embodiments, the display may be a low-power display such as an electronic ink display and the display maybe updated with any of various information, including destination addresses of where the device is being shipped. The device may be equipped with various sensors, such as GPS sensor for tracking shipping progress of the device or environmental sensors such as accelerometers, temperature sensors, humidity sensors, pressure sensors, or the like. Data associated with the sensors may be displayed by the display, in embodiments. The device may be ruggedized such that the device is less likely to be damages during transit, in embodiments.

In embodiments, the shippable device is configured such that a ruggedized enclosure, surrounding persistent storage and incorporating an electronic display act as a self-contained whole. Such an arrangement may reduce shipping errors. For example, because the persistent storage, the display and the enclosure are coupled as a self-contained whole, it may not be possible to mismatch persistent storage intended for one container in a different contained. Similarly, it may not be possible to mis-label the shippable unit (e.g., by putting the wrong label on the device) because the display is built into the shippable whole. Thus, errors associated with mismatched labels, containers and items may be reduced by such a shippable storage device.

Various processes may be instituted by a service provider or customer that uses the device, such as processes to keep the data secure, for example. For instance, a service provider, such as a storage service provider with a number of devices, may implement a provisioning process that ties a particular device to a particular request for data transfer services. The service provider may install security information on the device and direct the display of the device to display a shipping destination associated with the request and provide the device to a carrier as a self-contained shipping container, in embodiments.

In another process, such as when the customer that requested the service receives the device, the customer may connect the device to a customer network and download a proprietary application corresponding to the device. When the application is executed by a customer computer on the customer network, the application may discover the connected device on the network and validate the data transfer device. In some embodiments, the application may be used to identify data on the customer network that is to be transferred to the device and the application may encrypt the identified customer data and load the encrypted data onto the device.

In some embodiments, the destination information for the device may be updated. For example, updated address information may be obtained over the customer network or from memory of the device and displayed on the electronic display. In some embodiments, the device may realize (e.g., based on a GPS sensor) that it is located at the customer location and change the displayed address information from the customer site to the next destination. The customer may then provide the device to a carrier as a self-contained shipping container for shipment without any other additional packaging or labeling.

In another process, when the device is received back at the service provider (in accordance with an address or a coded indicating an address displayed by the display), for example, an ingestion process may be performed. For instance, the data transfer device may be connected to a service provider network, the data on the device decrypted and stored to a storage service of the service provider, and the data transfer device prepared for re-use.

In some embodiments, the electronic display may be configured to turn on or off according to logic. For instance, in order to hide the location of the service provider storage network, the device may be configured to not display the destination address of the service provider until the device has left the customer facility (e.g., and is received by a carrier). Program logic may rely upon GPS or cellular data to determine the device location and adjust the display accordingly.

In some embodiments, the entire device may be configured to act as the user interface for the device. For example, the device may be configured to respond to shaking of the device by waking up the display from a sleep mode where the display is blank. Shaking of the device may cause the display to display the destination address or a message, in embodiments.

The device may be configured with a keypad (e.g., a physical keypad or a virtual keypad via the display) or may be configured to respond or provide audible commands, instructions or messages.

FIG. 1 illustrates a system and process for a shippable data storage device with network-updateable electronic ink shipping display, according to some embodiments. The illustrated embodiment depicts movement of a shippable data storage device from a service provider location 120 to an enterprise location x 110 and back to the service provider location 120 as well as various processes A-G that are performed along the way by various entities. The device 130 depicted in FIG. 1 may be the same as the device 130 depicted in FIGS. 2, 3, 8 and 9A-9D, in embodiments.

Enterprise location x 110 is depicted in FIG. 1. But in some embodiments, the enterprise may have other locations and the shippable data storage device 130 may be shipped to those locations instead of, in addition to, before, or after the depicted shipment B. In some embodiments, multiple different devices may be shipped to various locations at the same time as the depicted shipment. Shippable data storage devices may be shipped to entities other than enterprises, for example but not limited to, customers, government entities, other service providers or the like. Computers, such as a server or desktop computers at the enterprise location x 110 may perform some or all of the processes illustrated in FIGS. 4 and 6, in embodiments. Computers, such as a server or desktop computers at the service provider location 120 may perform some or all of the processes illustrated in FIGS. 5 and 7, in embodiments.

In the depicted embodiment, (A) a customer creates, generates or requests that a job be performed. The job creation or request may be performed via a console such as a network-based page or site of the service provider that the enterprise accesses via one or more networks (e.g., network 108). At (B) the service provider provisions a particular shippable data storage device 130, instructs the device to display an address associated with enterprise location x 110 (e.g., obtained during job creation (A)) and ships the device to the requesting customer according to job information (e.g., job information may be determined during generation of the job at request time, in some embodiments). At (C), the device is received at the enterprise location X 110 and customer data is transferred to the device at the customer site. At (D) the electronic display is updated with a new destination for the device. For example, the service provider may send an updated address via network 108, or the device may recognize it is at the enterprise location and automatically update the displayed destination address from a memory store programmed with the next destination during the provisioning step (B), in embodiments. At (E) the device is provided, by the enterprise or customer to a shipping carrier and the device is shipped back to the provider. In some embodiments, the device may be sent to one or more other customer sites for additional data before being sent back to the service provider. At (F) the device is received back at the service provider, connected to a service provider network, and customer data is ingested from the device into the service provider system. At (G) the device is wiped and is stored until it is provisioned for another job.

Other various use-cases are contemplated, a device may be shipped onto other entities, such as a customer's customers after it has been received by, and the data uploaded at, a storage service provider, for example. In some embodiments, the device may be sent onto other customers distinct from the customer that sent the device to the storage service provider. The device may be used to distribute the same data to multiple different sites of the same customer, in embodiments. The device may be instructed to display various addresses at various times, such that the device is used to multi-cast data, for example in either the export or import embodiments. It is contemplated that the various addresses may be stored on the device at once, such as when the device is provisioned, for example, or the various addresses may be sent to the device over a network, such as a cellular network or via a customer or provider network or combination thereof. In embodiments, the device may include logic configured to update the displayed address based on the device sensing a geographical position or location of the device. For instance, a device that determines (e.g., based on a GPS sensor or cellular triangulation) that it has arrived at one location, may be configured to display the next address stored in memory of the device.

Figure 2:
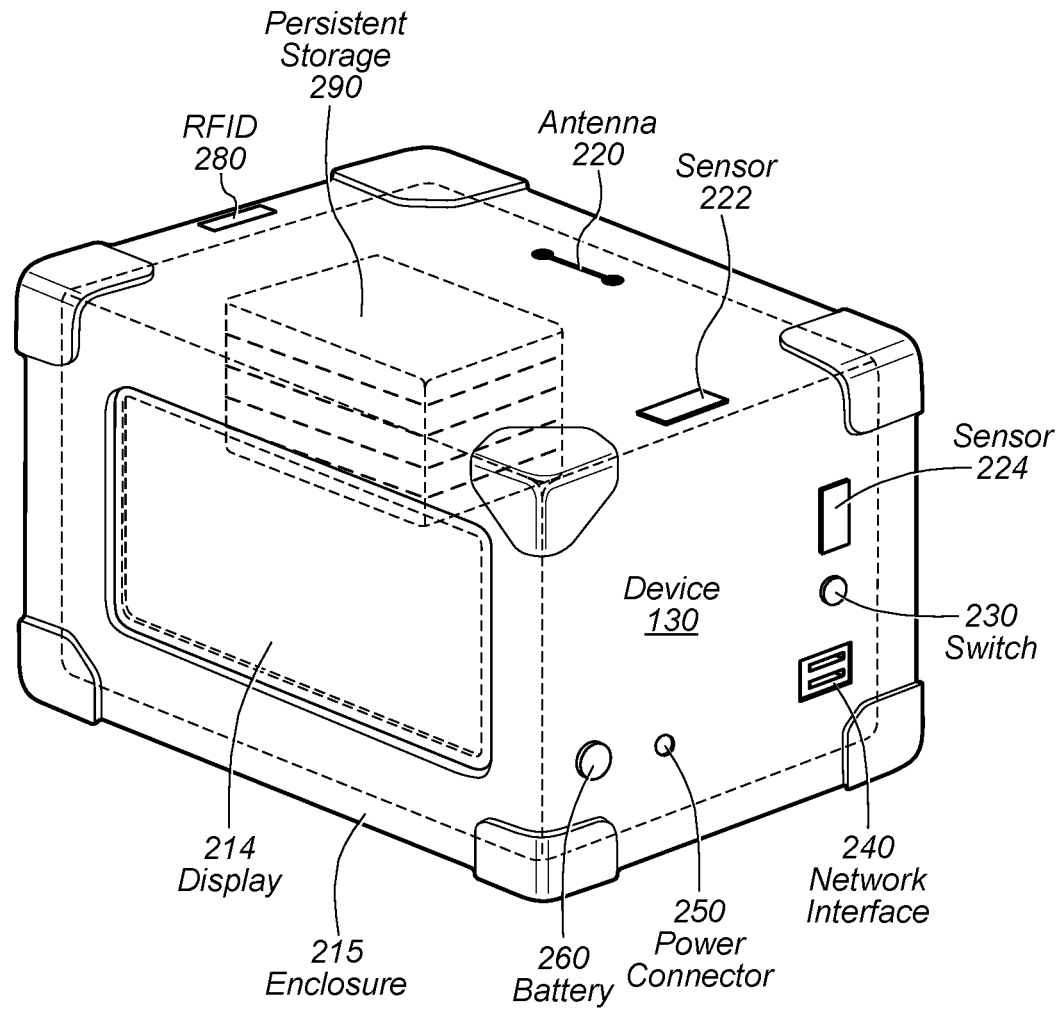
FIG. 2 illustrates a shippable data storage device with a network-updateable electronic ink shipping display, according to some embodiments.

FIG. 2 illustrates a shippable data storage device with a network-updateable electronic ink shipping display, according to some embodiments. The depicted shippable storage device 130 may be used to move large amounts of customer data off of customer storage networks or servers to other storage networks or servers, when other forms of transfer (e.g., broadband data transmission) are unavailable or cost or time prohibitive, for example. Embodiments of the shippable storage device may include more, less, or different features or components than those depicted, in embodiments.

In the depicted embodiment, shippable data storage device 130 includes an enclosure 215 surrounding persistent storage 290. The persistent storage may include any type of storage such as, but not limited to hard disk drives, optical media, magnetic tapes, memristor storage, persistent RAM or solid state storage devices. The enclosure may be ruggedized (e.g., according to various standards, such as military standards or electronics industry standards) and may be configured with an outward-facing electronic display 214 such that when enclosed by the enclosure, the persistent storage, the enclosure, and the electronic display form a self-contained shipping container suitable for shipping without any additional packaging, labeling or the like and such that the electronic display 214 acts as to display a destination location (e.g., in lieu of a shipping label). In embodiments, the enclosure 215 and the display 214 act as reusable shipping components in lieu of cardboard boxes and shipping labels. The enclosure may include various mechanisms to facilitate movement of the device 130, such as rollers, handles or the like.

Device 130 is illustrated with battery 260 and power connection 250 for powering some or all of the components of the shippable device that require power to function. The power connection 250 may be configured to connect the shippable device to an external power source, in embodiments. The power connector may power the persistent storage, in some embodiments. Other sources of power are contemplated, such as kinetic energy sources that rely upon the motion during shipping to power the shippable storage device, solar energy sources, or the like. Any of various power sources may power the electronics (e.g., the display or the storage) of the shippable storage device 130.

Device 130 is depicted with display 214. The display may incorporate any of various display technologies, such as low-power electronic-ink (E-ink), organic light emitting diodes (OLED), active-matrix organic light-emitting diode (AMOLED), flexible displays or touch-sensitive displays as non-limiting examples. Low-power e-ink displays may provide the benefit of reduced power consumption for a shipping environment where small batteries (e.g., batteries that cost less to ship, are less expensive or take up less shipping space) are preferred. The device 130 may be configured with multiple displays 214, in some embodiments. For example, some carriers or fulfillment centers label three sides of a shipping container such that the destination of the container can be scanned or read irrespective of the orientation of the container. Similarly, multiple displays can be incorporated into multiple sides of the enclosure 215 of the device. For example, the enclosure may be configured with 1-6 or more displays, in some embodiments. The various displays maybe configured such that the displays are computer readable (e.g., via scanner).

Device 130 is illustrated with network interface 240. The network interface 240 may act as interface between the shippable storage device 130 and various networks, such as LANS, WANS or the like (e.g., via various protocols, such as iSCSI or Ethernet). In some embodiments, network connection 240 may act as an interface directly to another device (e.g., via SCSI).

Device 130 is illustrated with switch 230. The switch 230 may act as an on-off power switch or as a switch to activate the display, in some embodiments. Device 130 is also illustrated with antenna 220. The antenna may be configured to facilitate wireless communication between the service provider or customer and the device. For example, the wireless communication may be over various cellular networks, Wi-Fi, or the like (e.g., network 108). For instance, the service provider may send updated address information to the shippable storage device 130 via cellular networks while the device 130 is en route to some location. The updated address information may be displayed via the display 214 such that the device 130 is rerouted on the fly, for example. In other embodiments, the wireless communication channel may be used to send updated shipping information for display while the device is located at the customer site. In embodiments, cellular networks may be used to track the device.

Device 130 is illustrated with radio frequency identification (RFID) 280. The RFID may assist with tracking the device, in some instances. For example, devices may be identified during the provisioning process via a respective RFID or devices may be identified upon receipt at the customer or upon return to the service provider by a respective RFID. The RFID may be used to track the shippable storage device as the device is routed through a facility, such as through a service providers fulfillment facility (e.g., while routed on a conveyor system).

Device 130 is illustrated with various sensors 222, 224. The device may be outfitted with any of various sensors including a global positioning sensor (GPS), a temperature sensor, a humidity sensor or an accelerometer, all as non-limiting examples. Data may be collected from the sensors and used in various manners, such as to record the environment of the device (e.g., hot, cold, moderate, moist) or record various events associated with the device 130, such as a drop, quick movement, orientation or location of the device 130. The sensor data may be stored locally, sent over the network 130 or displayed via display 214.

Device 130 may be configured with multiple layers of security. For example, data stored on the device may be encrypted one or more times, with one or more keys. The keys may be determined, stored, controlled or held by various parties and applied at various steps of the illustrated processes. For example, some keys used to encrypt the data stored on the device may be stored separate from the device, while other keys used to encrypt the data on the device may be stored with the device. The encryption keys may be applied in multiple layers, in embodiments.

Device 130 may be configured as one or more other types of network-based device or other electronic devices, such as transient local hardware for example. In an example, non-exhaustive list, device 130 may be configured as various combinations of cryptographic hardware and software (e.g., as a type 1 cryptographic device), as a storage gateway, as a web service, a firewall, a high-assurance guard, a server, virtual machine image, one or more dongles, a data warehousing solution or database service box, or the like.

Figure 3:
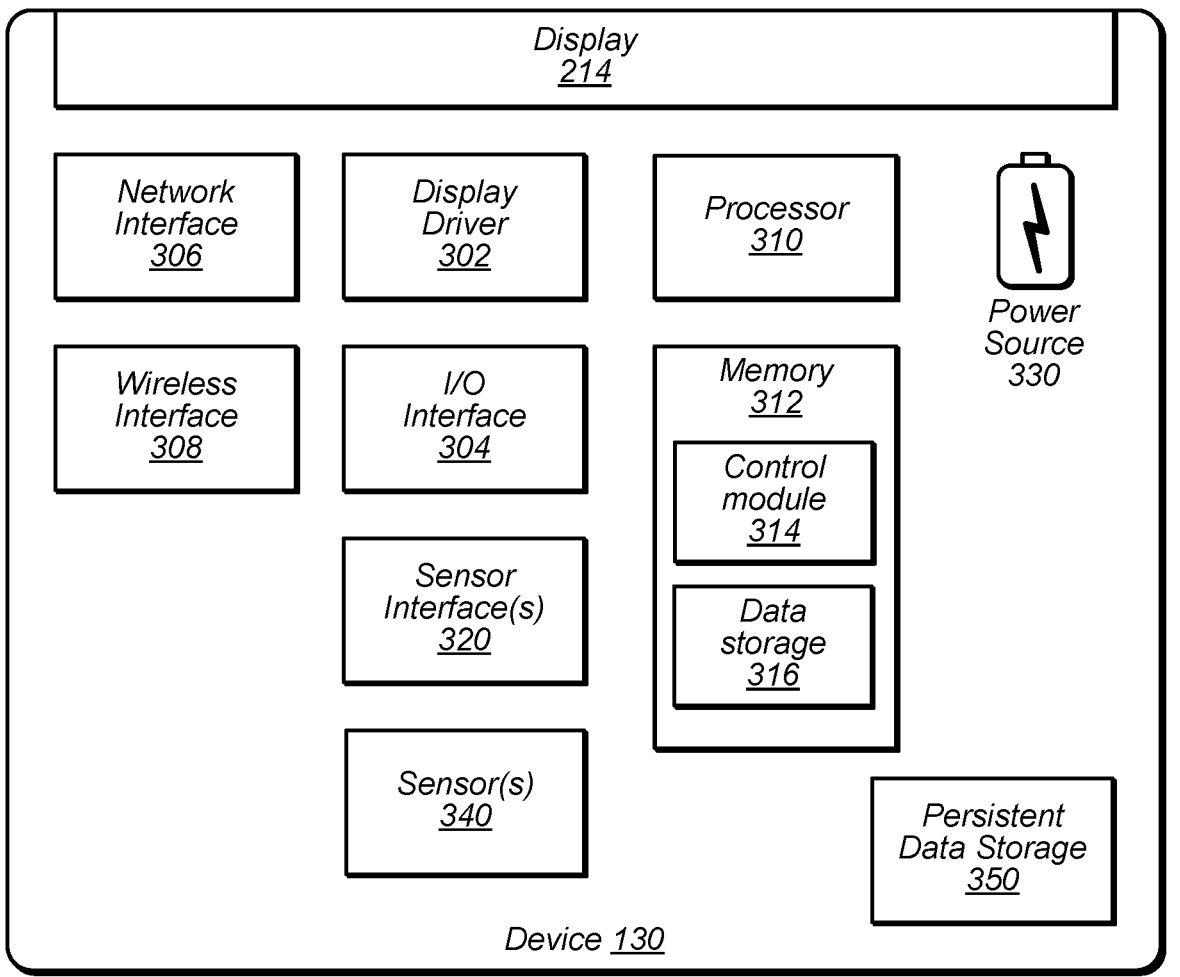
FIG. 3 is a schematic view of a shippable data storage device with a network-updateable electronic ink shipping display, according to some embodiments.

FIG. 3 is a schematic view of a shippable data storage device 130 with a network-updateable electronic ink shipping display, according to some embodiments. FIG. 3 illustrates various components and modules of a shippable storage device 130. The device may be configured with fewer or additional components or modules. Some component or module may be replaced by other component or modules. For example, the processor 310 and memory 312 may be replaced by firmware, in embodiments. Various components or modules may perform some or all of the processes illustrated in the FIGs., in embodiments.

In FIG. 3, device 130 is illustrated with display 214, network interface 306 and persistent storage 350. In the illustrated embodiment, display driver 302 provides an interface function between a processor 310 and display 214. For example, to instruct the display to display an address, processor 310 executes computer instructions from memory 312 that send messages to display driver 302 that are interpreted by the display driver and cause the display driver to display the address on display 214.

Network interface 306 acts as an interface between an external network (e.g., a customer network or a service provider network or network 108) and the device. In embodiments, the network interface is configured to transmit instructions to the device or to transmit encrypted data to the persistent storage 350. Wireless interface 308 may be configured to receive (e.g., via cellular or Wi-Fi network) instructions from the service provider. For example, the service provider 120 may send updated address information to the device 130 via a cellular network such that the displayed address of the device is updated en route, thereby changing the destination for the device in-flight such that the device is shipped to the updated address instead of the prior address.

Input/Output (I/O) interface 304 may be configured to coordinate I/O traffic between processor 310, memory 312, the display driver, network interface 306, wireless interface 308, sensor interface(s) 320 and persistent storage 350 or peripheral interface. In some embodiments, I/O interface 304 may perform any necessary protocol, timing or other data transformations to convert data signals from one component (e.g., system memory 312) into a format suitable for use by another component (e.g., processor 310). In some embodiments, I/O interface 304 may include support for devices attached through various types of peripheral buses, such as a variant of the Peripheral Component Interconnect (PCI) bus standard or the Universal Serial Bus (USB) standard, for example. In some embodiments, the function of I/O interface 340 may be split into two or more separate components, such as a north bridge and a south bridge, for example. Also, in some embodiments, some or all of the functionality of I/O interface 304, such as an interface to system memory 312, may be incorporated directly into processor 310.

Device 130 is depicted with persistent data storage 350. Persistent data storage 350 may include any combination of non-volatile storage such as hard drives or flash memory. Persistent storage 350 may be configured (e.g., during a provisioning process) to store large amounts of encrypted data (e.g., from a large data store such as a customer storage system) during shipment from the customer location to a service provider location where the data is transferred to a service provider storage system.

Device 130 is depicted with power source 330 that may power the various electronic components of the device 130 and with sensor(s) 340 and sensor interface(s) 320. As described above, any of various sensor(s) may be incorporated into device 130. Device 130 may also include various sensor interface(s) 320 that act as an interface between the sensor(s) 340 and I/O interface 304. The sensor interfaces may be proprietary interfaces, customized for a particular sensor, in embodiments. The sensor interfaces may perform various functions such as conversions of data, analysis of sensor output and output of information based on the analysis or the like.

Data Transfer Device Lifecycle

Figure 4:
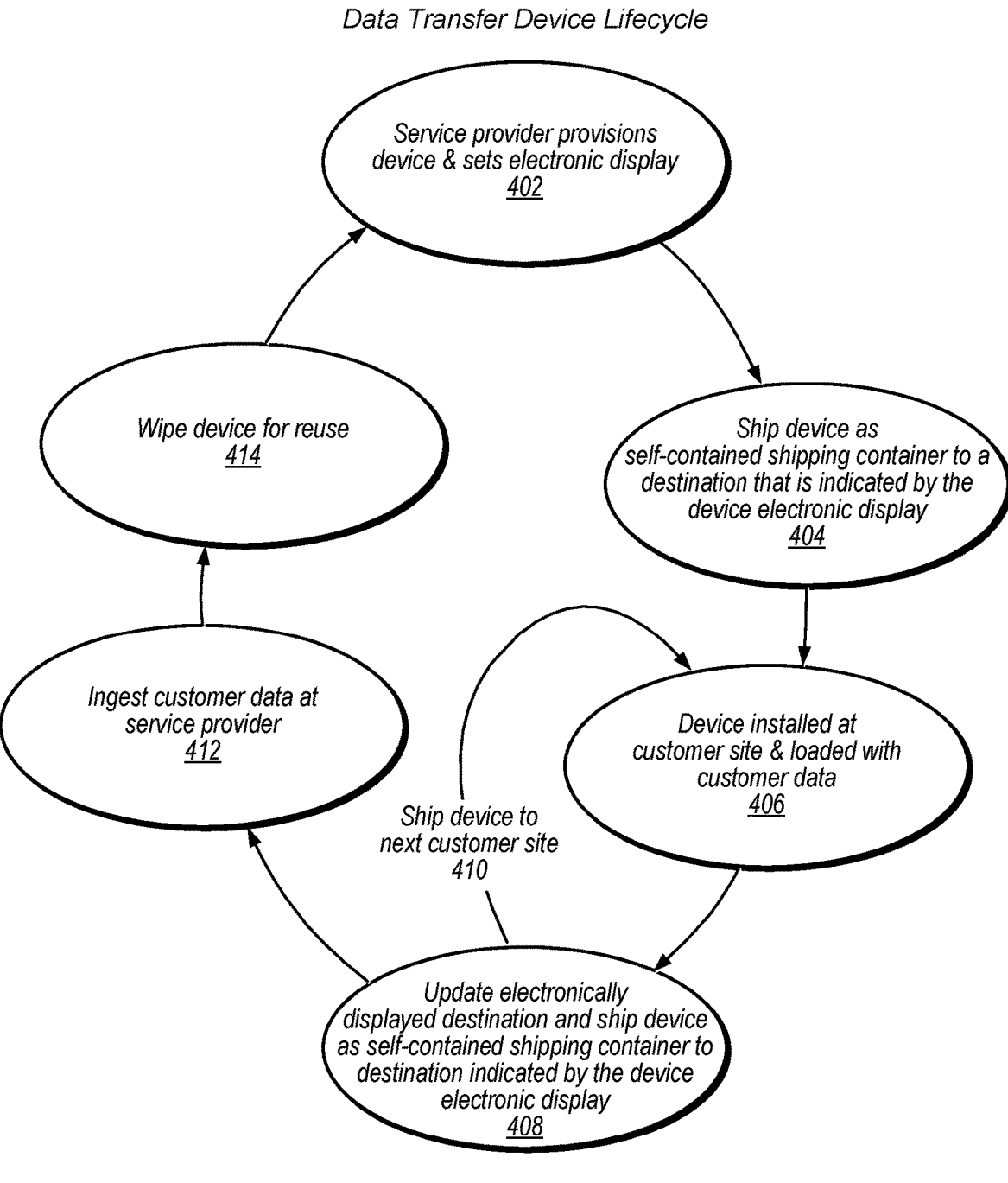
FIG. 4 is a flow diagram of a process of using a shippable data storage device with network-updateable electronic ink shipping display, according to some embodiments.

FIG. 4 is a flow diagram of a process of using a shippable data storage device with network-updateable electronic ink shipping display, according to some embodiments. FIG. 4 illustrates a data transfer device lifecycle, in embodiments. The illustrated process may be performed within the context of a shippable storage device 130, service provider 120 and customer enterprise location 110.

At 402, a service provider (e.g., service provider 120) provisions a shippable storage device (e.g., device 130) and sets an electronic display of the device. For example, the service provider may set the electronic display (e.g., via the device user interface or via an external connection through the network interface) to display a customer destination address. In embodiments, the service provider may also store a return address or the address of another customer facility in memory of the device such that the display can be updated with the stored address at some point.

At 404, the device 130 is shipped as a self-contained shipping container to a destination that is indicated by the device's electronic display. For example, the service provider may provide the device with the enclosure, the display, the persistent storage and the network interface to a common carrier without any additional packaging or labeling. The common carrier may ship the device through the carrier network to the destination without packaging or labeling in addition to the enclosure and electronic display, in embodiments.

At 406, the device is received at the customer site (e.g., enterprise location x 110) the device is installed onto a network at the customer site and data is loaded onto the device 130. At 408, the electronically displayed destination may be updated and the device 130 shipped as a self-contained shipping container to the updated destination indicated by the device's electronic display. The display may be updated with a destination address or code that was stored in memory of the device 130 at provisioning or received over a network (network 108) while en route or at a customer location. The updated address may be a return address for returning the device to the service provider or an address of another location for the same or different customer (e.g., security provisions may be implemented such that data from multiple customers can be stored on the device).

At 410, the device is shipped to the next customer site, where the device can be installed and more data encrypted and loaded onto the device 130 (similar to 406) and the process may continue through 408 and 410 one or more times until the device is updated with the service provider address and given to a carrier to ship to the service provider network location. At 412, the data from the device 130 is ingested or transferred into a storage service of the service provider 120. For example, the device is received by the service provider 120, connected to a service provider network, the data from the device unencrypted and the data stored to a service provider storage service.

At 414, the device is wiped of data (e.g., customer data and security information deleted or overwritten) and readied for reuse. The process may begin again at 402 and continue.

Figure 5:
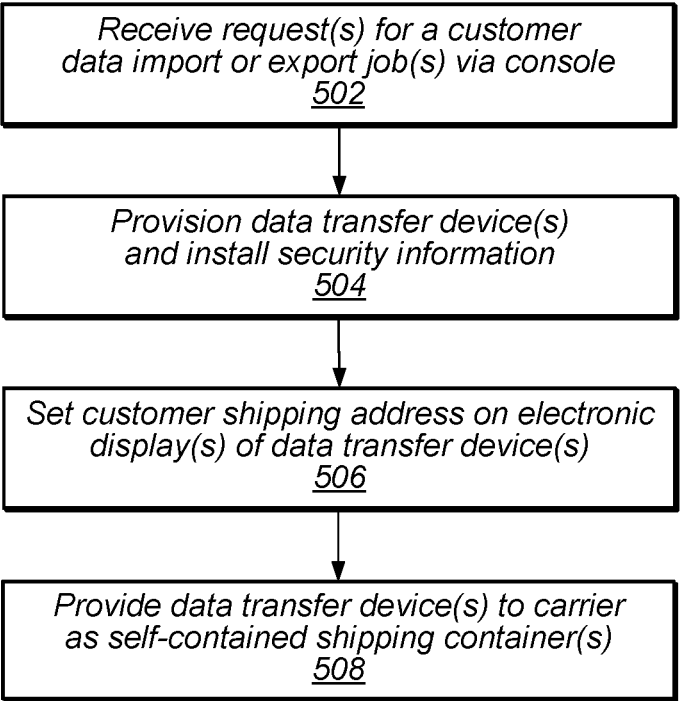
FIG. 5 is a flow diagram of a provisioning process associated with a shippable data storage device with network-updateable electronic ink shipping display, according to some embodiments.
Figure 6:
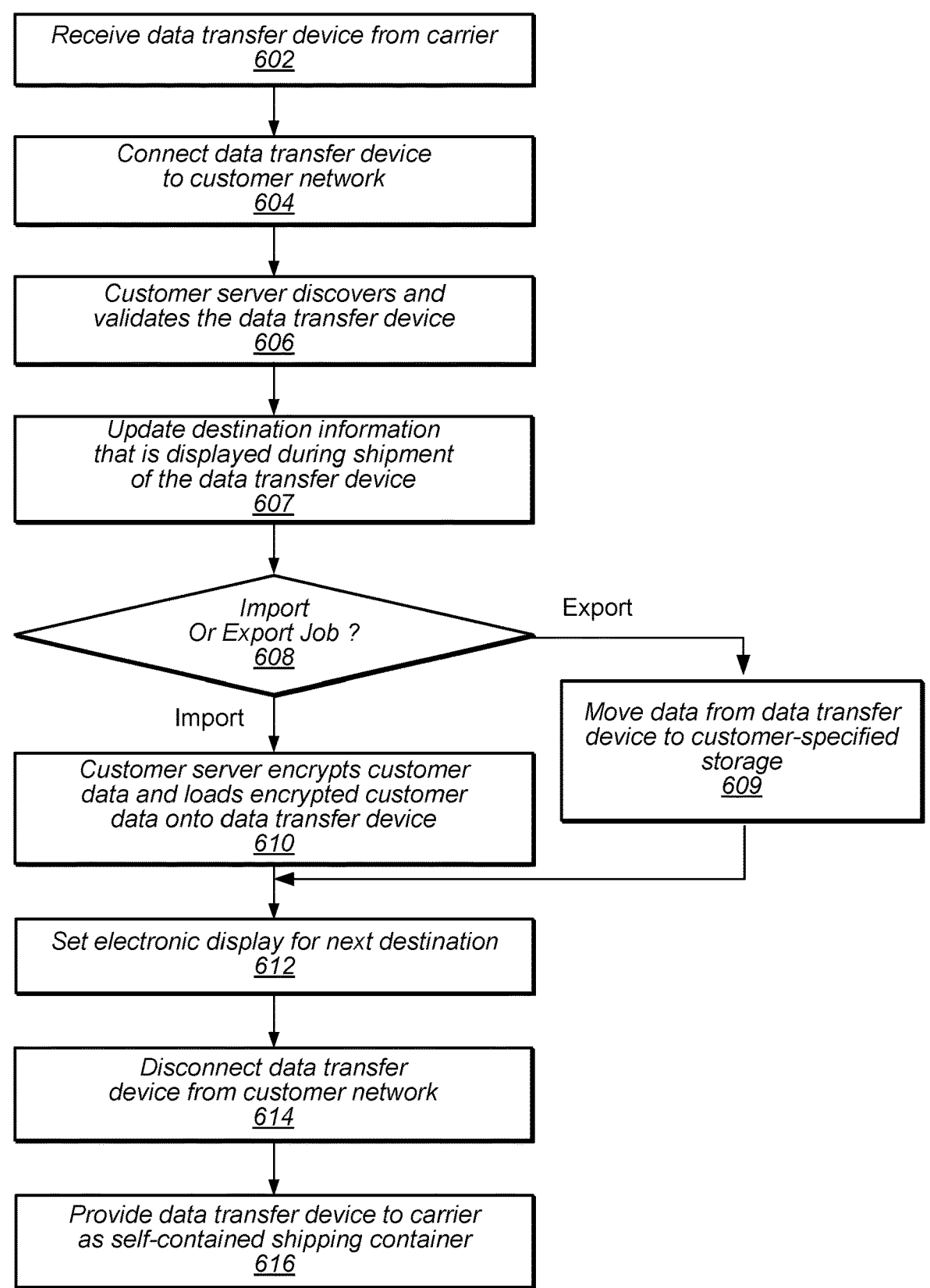
FIG. 6 is a flow diagram of a client side process associated with a shippable data storage device with network-updateable electronic ink shipping display at a customer location, according to some embodiments.
Figure 7:
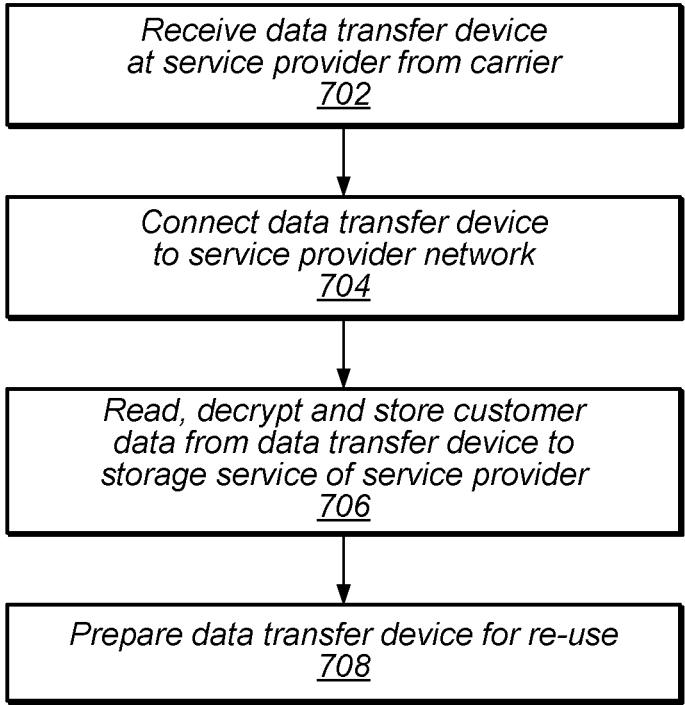
FIG. 7 is a flow diagram of a service provider data ingestion process associated with a shippable data storage device with network-updateable electronic ink shipping display, according to some embodiments.

FIGS. 5-7 illustrated various processes associated with device 130. FIG. 5 illustrates a provisioning process that may be performed by the service provider that associated a particular device 130 with a particular customer job. FIG. 6 illustrates a customer-side process for connecting the device to the customer's storage, loading data onto the device, and updating the electronic display with the next destination. FIG. 7 illustrated a process of off-loading data from the device that may be performed by the service provider when the device 130 is received back by the service provider. The illustrated processes depict alternative import/export embodiments where appropriate.

Provisioning

FIG. 5 is a flow diagram of a provisioning process associated with a shippable data storage device with network-updateable electronic ink shipping display, according to some embodiments. One or more portions of the illustrated process may be performed by one or more processes executing on a provider computer or network, in embodiments. The illustrated process may be performed on device 130, illustrated in FIGS. 1-3.

At block 502, one or more requests are received for a customer data import or export job(s) via a console. The console may be configured to provide access and management of data transfer projects or jobs through a network-based user interface. The network-based user interface may be provided by the service provider, in embodiments. The console may be configured to receive various project data from the customer and to provide that data to the service provider. The service provider may use the data as part of the provisioning process as well as part of an authentication process on the customer network when the device is connected to the customer network, in embodiments.

At block 504, the data transfer devices are provisioned and security information is installed on the devices. For example, particular data transfer devices may be removed from storage, associated with a customer project or job and loaded with keys, security certificates or the like such that the device 130 can be shipped to the customer that made the request.

In an export embodiment (e.g., when a customer requests to export data from a storage service provider system via the data transfer devices), data may be loaded from a storage network of the service provider onto the data transfer devices.

At block 506, the electronic display 214 of the data transfer device 130 may be set with the customer-supplied shipping address (an address obtained via the console, for example). For example, the service provider may set the display via the network interface of the device. At block 508, the data transfer devices 130 are provided to the carrier as self-contained shipping containers. For example, the data transfer device may be provided to, and shipped by, a common carrier without any additional packaging or labeling beyond the enclosure and electronic display device. In some embodiments, the device 130 may be configured to receive commands from a common carrier or from the service provider that cause the device to display bar codes or the like that are used by the common carrier for routing the device through the carrier network.

FIG. 6 is a flow diagram of a client side process associated with a shippable data storage device with network-updateable electronic ink shipping display at a customer location, according to some embodiments. Various portions of the process may be performed by a server or other computer on a customer network (e.g., enterprise location x 110) as part of moving data from the customer network to device 130. In some embodiments, portions of the process may be performed by a downloaded proprietary application executing on the customers hardware. The proprietary application may be downloaded from the service provider, in embodiments.

At block 602, the data transfer device is received from the carrier. For example, device 130 may be received at a customer site (e.g., enterprise location x 110) from a common carrier. The data transfer device is connected to the customer network (block 604). This may include physically connecting the device 130 to a network of the customer (e.g., via Ethernet or SATA or the like).

At block 606, the customer server (e.g., via execution of the downloaded application) discovers and validates the data transfer device. For example, the customer server may validate the data transfer device 130 based on one or more security certificates. At some point, the destination information that is displayed during shipment of the data transfer device may be updated (607), via network 108, via cellular network, or based on a stored address within the device, for example.

If the job is an export job (e.g., exporting data from the service provider storage network via the data transfer devices), the data may be moved from the data transfer device to customer-specified storage (block 609). If the job is an import job (e.g., importing data from the customer to the service provider), the customer server may encrypt the customer data and load the encrypted customer data onto the data transfer device (block 610) and the electronic display may be set for the next destination (block 612), based on the updated destination information, above, for example.

The data transfer device may be disconnected from the customer network (block 614) and the data transfer device may be provided to a carrier as a self-contained shipping container (block 616), as described herein. In some embodiments, the device 130 may be sent to another customer for more data to be loaded on the device before being sent back to the service provider (e.g., provider 120).

FIG. 7 is a flow diagram of a service provider data ingestion process associated with a shippable data storage device with network-updateable electronic ink shipping display, according to some embodiments. In embodiments, an application executing on the service provider 120 network performs some portion of all of the process illustrated in FIG. 7, after the device is received back from the customer 110, for example.

At block 702, the data transfer device is received at the service provider from a carrier (e.g., as a self-contained shipping container 130). The data transfer device may be connected to the service provider network (block 704) and the customer data from the data transfer device read, decrypted and stored to a storage service of the service provider (block 706). The data transfer device may be prepared for re-use, the customer data and/or security information wiped from the persistent storage of device 130, for example.

Figure 8:
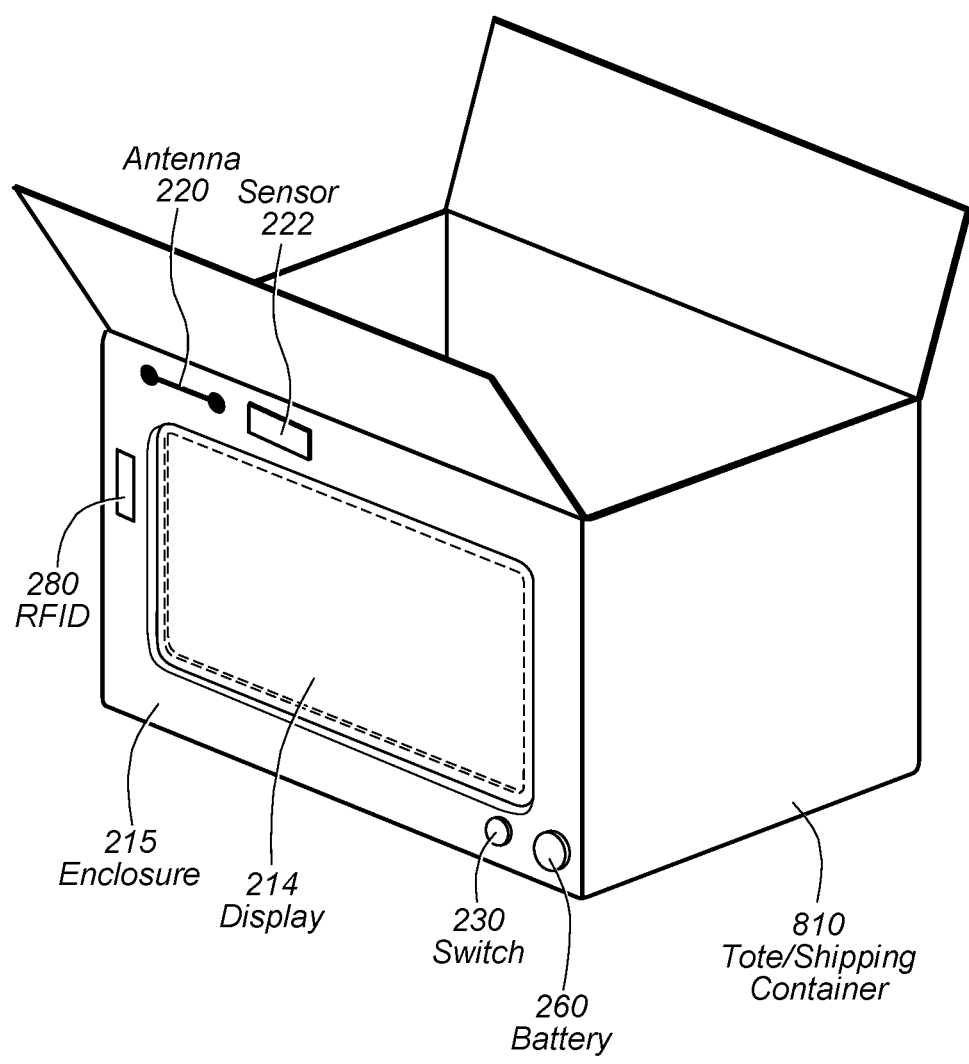
FIG. 8 illustrates a shippable tote/shipping container a with network-updateable electronic ink shipping display, according to some embodiments.

FIG. 8 illustrates a shippable tote/shipping container a with network-updateable electronic ink shipping display, according to some embodiments. The tote or shipping con-tainer 810 illustrated in FIG. 8 may comprise more, the same, or fewer components or modules than illustrated device 130 of FIGS. 2 and 3. Tote 810 is illustrated with an enclosure 215 that can be opened such that items can be place into the enclosure of the tote. Some totes may be open without flaps, in some embodiments.

Tote 810 is illustrated with antenna 220, sensor 222, RFID 280, display 214, switch 230, and battery 260. The features may perform functionality similar to the functionality describes for the shippable data transfer device 130 illustrated in FIG. 2 and described, above. In some example embodiments, tote 810 may be filled with groceries and shipped to a customer. Sensor 222 may record the temperature of the environment of the tote 810 as it is transported to the customer. In some embodiments, the temperature or a related message or warning may be displayed by the tote 810 on display 214, that the tote remained below some temperature or the tote was in a warm environment for some period of time, for example. In another example, shipping container 810 may be configured with an accelerometer sensor 222 the records data indicating that the shipping container was dropped and may be further configured to display a message via display 214 acknowledging the drop or indicating when and where the drop happened.

Tote 810 may be configured to carry various different items, such as high value items (e.g., wine or diamonds), live items (e.g., livestock or fowl), groceries, or anything else that fits in the container. The tote may be configured with various other features to make the container suitable for particular contents such as insulation for carrying frozen groceries, for example.

FIGS. 9A-9D illustrate various types of information displayed via an updateable electronic display, according to some embodiments. The illustrated examples are applicable to various device embodiments including but not limited to those depicted in FIGS. 1-3 and described above.

Figure 9A:
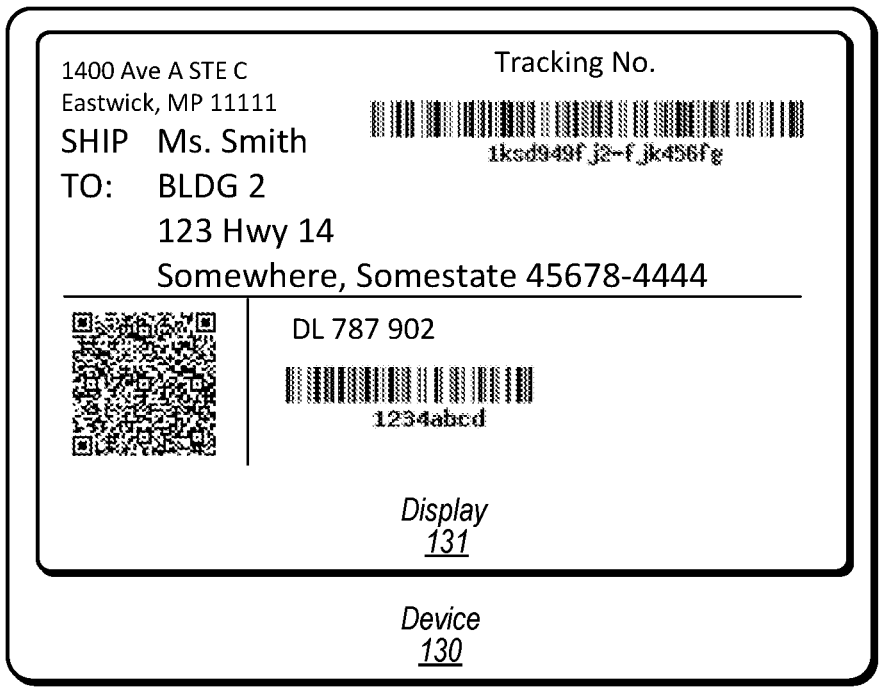

FIG. 9A illustrates an updateable device display of a shippable data storage device with network-updateable electronic ink shipping display. In the illustrated embodiment, the display 214 of device 130 is displaying sender (1400 Ave. A, STE C) and recipient address information (BLDG 2, 123 HWY 14), tracking information (e.g., tracking bar code and associated tracking no. 1ksd949 . . . ), a routing code DL 787 902 (e.g., tells how to route a package within a carrier network or facility), a postal bar code that features the zip code for the package's destination (e.g., 1234abcd), and a QR code that may encode various information (e.g., postal code, country code, service class (1DA etc.), tracking number, Julian date, package quantity and weight, address validation, and ship street, city and state).

Figure 9B:
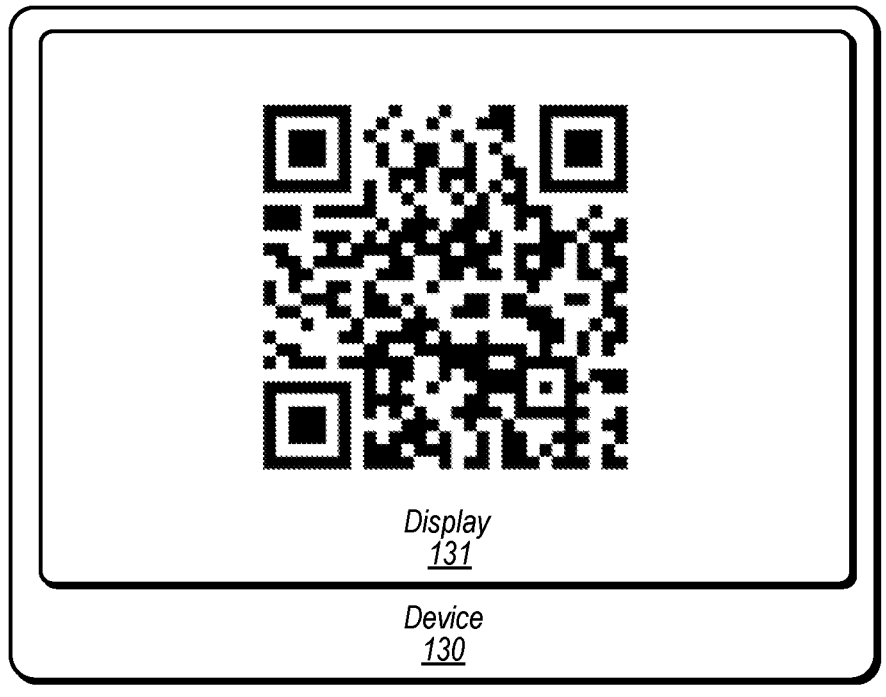

In some embodiments, various information may be hidden or obscured or displayed in code, instead of directly displayed in the display. For example, addresses may be coded so as to obscure the destination from being readily recognizable without computer aid such as a scanner. For example, FIG. 9B illustrates an updateable device display of a shippable data storage device with network-updateable electronic ink shipping display where the display 214 of device 130 is only displaying a single QR code. Any of various information may be encoded in the QR code and decoded via scanner or image processing device such as address information, or the like. In some embodiments, information may be hidden or obscured or not displayed according to geographical location. For example, the data transfer device may not display the address of the service provider while at the customer site and may instead display instructions to provide the data transfer device to a carrier.

The device may transition the display to display the address of the service provider once the device has left the customer premises, or may display a coded version of the destination address that is only computer readable, in embodiments.

FIG. 9C illustrates an updateable device display of a shippable data storage device with network-updateable electronic ink shipping display. In the illustrated embodiment, display 214 of device 130 is displaying a warning message that the destination address intended for display via the electronic display does not match a security certificate. Various other messages or information may be displayed, such as sensor data, instructions (e.g., instructions for using the device), other warnings or the like.

FIG. 9D illustrates an updateable device display of a shippable data storage device with network-updateable electronic ink shipping display. In the illustrated embodiment, the display 131 of device 130 has been instructed to display a message associated with various sensors of the device 130. The displayed sensor information may include metadata associated with the sensed data. In the illustrated example, the display has been instructed to display the message "Container environment reached 47 degree Celsius on May 5, 2015 at 9:15 a.m. at location 30.282180, −97.824945. Other messages associated with other sensors may be instructed for display on device 130, in embodiments. For example, the display may be instructed to display instructions for using the device, such as instructions from a user manual stored on the device or sent to the device via a network. Other messages may be displayed, such as messages associated with a lost or stolen device are also contemplated.

Figure 10:
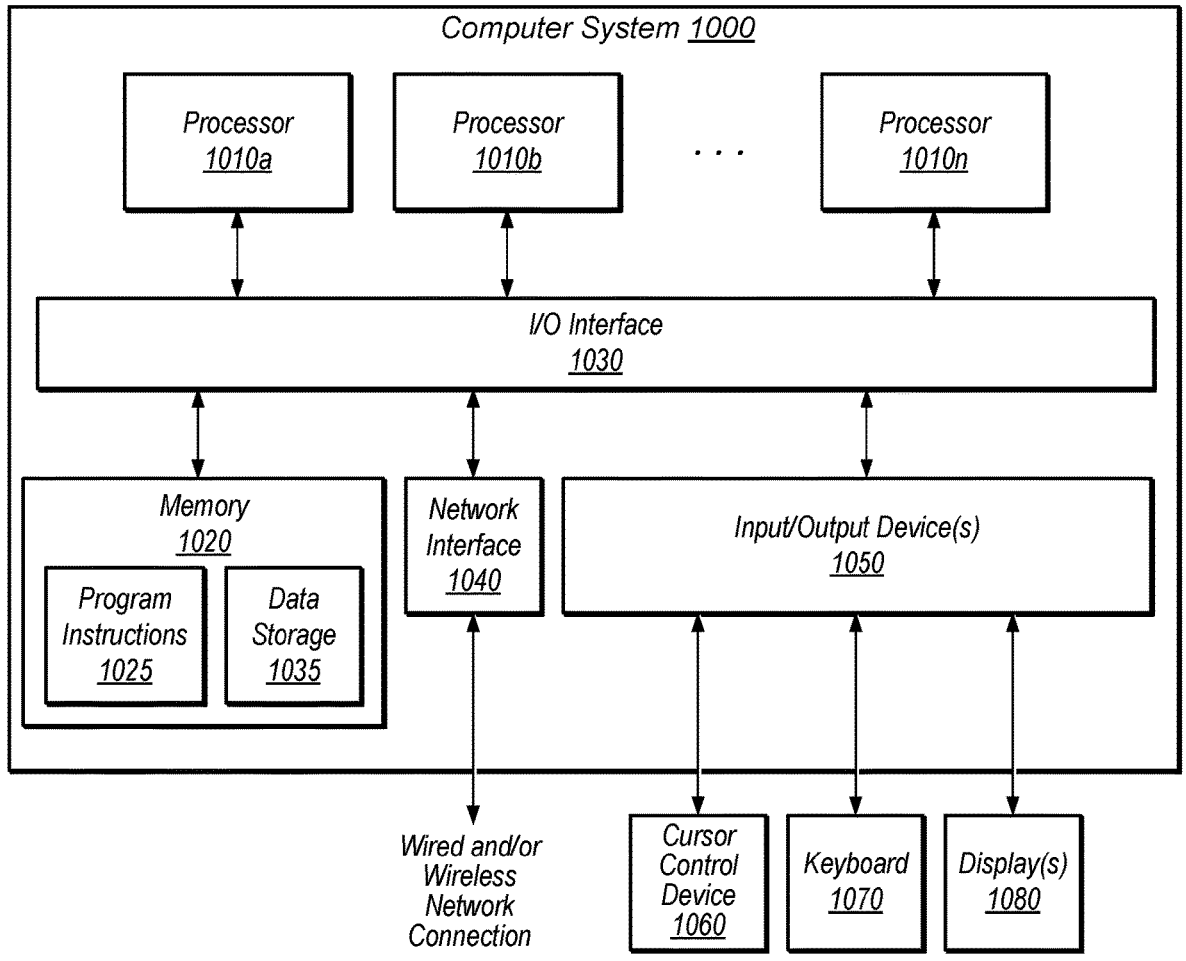
FIG. 10 is a block diagram illustrating an example computer system that implements some or all of the techniques described herein, according to different embodiments.

Any of various computer systems may be configured to implement the processes associated (e.g., provisioning or ingestion by the service provider or execution of the downloaded application on a customer server) with a shippable data storage device with network-updateable electronic ink shipping display. For example, FIG. 10 is a block diagram illustrating one embodiment of a computer system suitable for implementing some of the systems and methods described herein. In various embodiments, the storage service of the service provider at the storage service location 120, or customer computers at enterprise location 110 (e.g., customer server) may each include a computer system 1000 such as that illustrated in FIG. 10.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030. In some embodiments, computer system 1000 may be illustrative of servers implementing enterprise logic or downloadable application, while in other embodiments servers may include more, fewer, or different elements than computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be embedded processors implementing any of a variety of instruction set architectures (ISAs), such as the x106, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor 1010. In various embodiments, system memory 820 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the service provider or downloadable proprietary software are shown stored within system memory 1020 as program instructions 1025. In some embodiments, system memory 1020 may include data 1035 which may be configured as described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, for example. In particular, network interface 1040 may be configured to allow communication between computer system 1000 and/or various I/O devices 1050. I/O devices 1050 may include scanning devices, display devices, input devices and/or other communication devices, as described herein. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1000 via I/O interface 1030. A computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

In some embodiments, I/O devices 1050 may be relatively simple or "thin" client devices. For example, I/O devices 1050 may be configured as dumb terminals with display, data entry and communications capabilities, but otherwise little computational functionality. However, in some embodiments, I/O devices 1050 may be computer systems configured similarly to computer system 1000, including one or more processors 1010 and various other devices (though in some embodiments, a computer system 1000 implementing an I/O device 1050 may have somewhat different devices, or different classes of devices).

In various embodiments, I/O devices 1050 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 1050 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with recommendation engine 195 or device 130. In general, an I/O device 1050 (e.g., cursor control device, keyboard, or display(s) may be any device that can communicate with elements of computing system 1000. In one embodiment, at least some of the I/O devices 1050 may be configured to scan or otherwise read or receive codes or identifiers of various objects and to communicate the codes to recommendation engine 195. Such components may include, but are not limited to, one or more of items, orders, containers or suitcases.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the enterprise logic, packing service, product database, device and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A network-attachable data transfer device, comprising:
an enclosure configured to ship the network-attachable data transfer device as a self-contained shipping unit;
an electronic display;
a persistent storage medium inside the enclosure, the persistent storage medium configured to store data during shipment, wherein the stored data is encrypted one or more times, with one or more keys;
a network connection configured to provide external access to the persistent storage medium as a network attached storage device; and
an external power connection configured to provide power, from a source external to the network-attachable data transfer device.

2. The network-attachable data transfer device as recited in claim 1, wherein the electronic display comprises an electronic ink screen configured to maintain display during shipping without power.

3. The network-attachable data transfer device as recited in claim 1, the device further comprising a radio-frequency identification (RFID) such that the network-attachable device is uniquely identifiable and trackable by the RFID.

4. The network-attachable data transfer device as recited in claim 1, wherein:
the network-attachable data transfer device is configured to display data, comprising sensor data or instructions, about the network-attachable data transfer device.

5. The network-attachable data transfer device as recited in claim 1, wherein:
the electronic display comprises a touch-screen configured to receive touch-based input to configure the network-attachable data transfer device for data transfer on a network; or
the network-attachable data transfer device comprises a physical keypad to receive input.

6. The network-attachable data transfer device as recited in claim 1, wherein the network-attachable device is provisioned with a keystore comprising one or more certificates that authenticate the network-attachable device and one or more keys for encrypting data stored to the persistent storage medium of the network-attachable data transfer device.

7. The network-attachable data transfer device as recited in claim 1, the device further comprising at least one of a temperature sensor, pressure sensor, or humidity sensor configured to sense a respective characteristic of an environment of the network-attachable data transfer device, and wherein the network-attachable device is configured to display information obtained from the at least one sensor on the electronic display.

8. The network-attachable data transfer device as recited in claim 1, wherein the network-attachable data transfer device is ruggedized in accordance with one or more standards comprising MIL STD 810 (MIL-SPEC) or IPXX (ingress protection) for dust and water protection.

9. The network-attachable data transfer device as recited in claim 1, wherein persistent storage medium comprises one or more hard disk drives, optical media, magnetic tapes or solid-state storage devices, and wherein the network-attachable data transfer device is configured to instruct display of one or more operational characteristics of the persistent storage medium via the electronic display.

10. A method, comprising:

receiving, by one or more computers of a service provider network of a service provider, a request for a customer data import job, wherein the request specifies a customer location of the data;

provisioning, at the service provider, a quantity of data transfer devices, distinct from the one or more computers, based on the customer data import job, wherein said provisioning comprises, for each of the quantity of data transfer devices:

installing, at the service provider, security information on the provisioned data transfer device, wherein the security information is usable to protect customer data stored on the data transfer device; and for each of the quantity of data transfer devices, directing shipment to the customer according to a shipping address on an enclosure of the data transfer device, wherein the enclosure provides a self-contained shipping unit for the data transfer device, and wherein the data transfer device comprises an electronic display and is configured for installation as network-attached storage on a network at the customer location in the enclosure.

11. The method as recited in claim 10, wherein said installing security information on the provisioned data transfer device comprises installing one or more security keys or one or more security certificates on the provisioned data transfer device.

12. The method as recited in claim 10, wherein said receiving the request for the customer data import job comprises receiving the request over a network via a client-facing console of the service provider.

13. The method as recited in claim 12, the method further comprising:

providing, via the client-facing console, access and management functionality for the customer data import job.

14. The method as recited in claim 10, the method further comprising:

receiving a given one of the data transfer devices at the service provider;

connecting the given data transfer device to a storage service of the service provider;

reading, decrypting, and transferring customer data from the given transfer device to a storage service of the service provider; and preparing the given data transfer device for re-use, preparing comprising wiping the customer data and security information from the given data transfer device.

15. The method as recited in claim 10, further comprising:

displaying, via the electronic display, instructions for using the device or a warning message.

16. A method, comprising:

subsequent to receiving a shipment of a data transfer device, wherein the data transfer device has an electronic display and comprises an enclosure and a persistent storage medium storing customer data inside the enclosure:

connecting the data transfer device, via a network connection configured to provide access to the persistent storage medium as a network attached storage, to a service provider network through the enclosure;

reading and decrypting the customer data from the data transfer device;

storing the customer data to a storage service of a service provider; and, preparing the data transfer device for re-use;

wherein the enclosure provides a self-contained shipping unit for the data transfer device.

17. The method of claim 16, the method further comprising:

displaying, via the electronic display, instructions for using the device or a warning message.

18. The method of claim 16, wherein said storing the customer data to a storage service of a service provider comprises storing the customer data to a customer-specified storage location at the storage service.

19. The method of claim 16, the method further comprising displaying, via the electronic display of the data transfer device, instructions for connecting the data transfer device to the service provider network.

20. The method of claim 16, wherein the method further comprises:

displaying, via the electronic display of the data transfer device, an indication of the progress.

determining progress of the data transfer device connection and data transfer; and displaying, via the electronic display of the data transfer device, an indication of the progress.

\* \* \* \* \*